July 25, 1967   D. W. PETERSON   3,333,241
TURN SIGNAL SYSTEM INCLUDING IMPULSE RELAYS
Filed Nov. 17, 1964

INVENTOR.
Donald W. Peterson
BY
Hugh L. Fisher
ATTORNEY

United States Patent Office 3,333,241
Patented July 25, 1967

3,333,241
TURN SIGNAL SYSTEM INCLUDING IMPULSE RELAYS
Donald W. Peterson, Fenton, Mich., assignor to General Motors Corporation, Detroit, Mich., a corporation of Delaware
Filed Nov. 17, 1964, Ser. No. 411,779
5 Claims. (Cl. 340—55)

ABSTRACT OF THE DISCLOSURE

This invention relates to a turn signal system including left and right signal lamps controlled by left and right impulse relays which are selectively and momentarily energized by a momentary contact type switch. The left or right lamps may be deenergized by successive energization of the corresponding relay. Alternate energization of the relays deenergizes the lamp on one side and energizes the lamp on the opposite side. Simultaneous energization of the relays energizes all lamps.

---

This invention relates to signaling systems and more particularly to a turn signal system for a motor vehicle.

The usual motor vehicle turn signal system employs a simple electrical circuit with a rather complicated manually set initiating device for the signals. The complications of the device are the result of provisions for automatic canceling of the system and manual override of the canceling structure. The present invention eliminates such mechanical complexities while retaining the convenience of present direction signals.

In accordance with the present invention, the turn signal lamps are connected to a source of intermittent current by momentarily energizing an impulse or memory-type relay and are disconnected from the source by a second momentary energization to the relay either manually or by return of the steering wheel to a neutral position after the turn is completed. Impulse relays are provided for both left and right turn signal lamps and are interconnected in a manner such that pulsing of one of the relays to connect its associated lamp with a source of intermittent current also pulses the other relay if it has been previously energized so as to insure disconnection of its associated lamp from the source of intermittent current. Since the relays are not mechanically interlocked, it is possible to energize both relays simultaneously when desirable to provide an emergency flare system with all signal lamps flashing.

A more complete understanding of the present invention may be had from the following detailed description which should be read in conjunction with the drawing in which.

Figure 1:
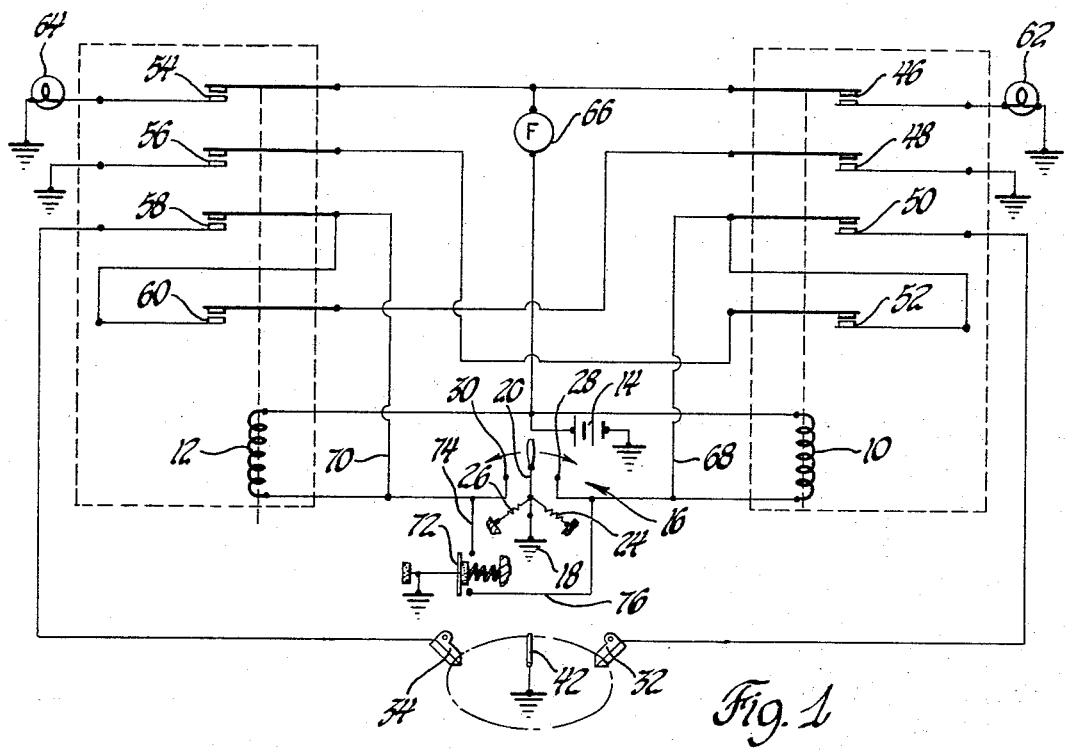
FIGURE 1 is a schematic diagram of the turn signal system of the present invention.
Figure 2:
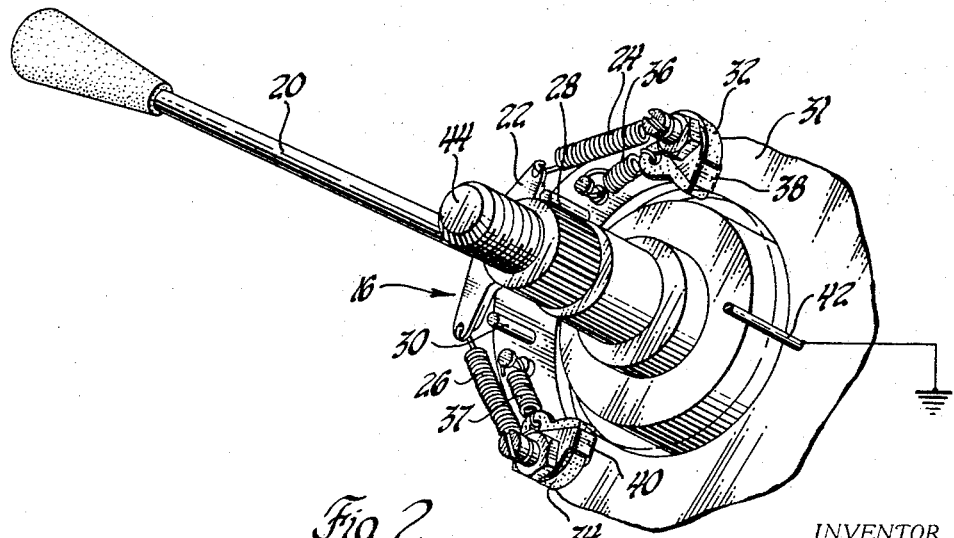
FIGURE 2 is a perspective view of the manual turn signal actuator utilized in the system.

Referring now to the drawing and initially to FIGURE 1, a pair of impulse or memory-type relays 10 and 12 are adapted to be connected across a battery 14 through a manually operable turn signal actuator mechanism 16 which is grounded at 18. As shown in FIGURE 2, the actuator 16 includes a lever 20 insulated from a grounded movable contact member 22 which is spring biased to a neutral position by the springs 24 and 26. The member 22 is adapted to engage stationary contacts 28 and 30 which extend through a mounting plate 31 attached to the steering column of the automobile. Engagement of the member 22 with the contacts 28 or 30 applies a momentary pulse of current to the relays 10 or 12, respectively. A pair of canceling triggers 32 and 34 are pivotally mounted on the mounting plate 31 and are biased to the position shown by the springs 36 and 37. The triggers 32 and 34 carry metal contact surfaces 38 and 40, respectively, which are adapted to be engaged by a grounded canceling pin 42 which is rotatable with the steering shaft 44. The canceling pin 42 may, for example, be mounted in the steering wheel of the vehicle.

Referring again to FIGURE 1, the relay 10 controls a plurality of normally open contacts 46, 48, 50 and 52 and the relay 12 controls normally open contacts 54, 56, 58 and 60. As indicated previously, the relays 10 and 12 are of the impulse or memory type, that is, successive pulses of current through the relay causes the normally open contacts to alternately close and open.

The right and left turn signal lamps 62 and 64 are connected to the source 14 through a flasher 66 and the normally open contacts 46 and 54, respectively. One side of the relay 10 is connected by the conductor 68 through the normally open contact 52 and the normally open contact 56 to ground and through the normally open contact 50 to the contact surface 38 of the canceling trigger 32. One side of the relay 12 is connected by the conductor 70 through the normally open contact 60 and the normally open contact 48 to ground and through the normally open contact 58 to the contact surface 46 of the canceling trigger 34. A grounded emergency flare switch 72 is adapted to momentarily bridge conductors 74 and 76 to simultaneously ground relays 10 and 12 when it is desirable to indicate an emergency condition.

Considering now the operation of the system and assuming that the driver wishes to make a left turn, the lever 20 is moved in a counterclockwise direction against the bias of the springs 24 and 26 to momentarily engage contact 30 thereby momentarily grounding the relay 12 which closes contacts 54, 56, 58 and 60. The closure of contacts 54 connects the left hand signal lamp 64 to the flasher 66 and also connects one side of the relay 12 through the conductor 70 to the contact 40 of the canceling trigger 34. Closure of the contact 60 provides a ground path for the relay 12 through the normally open contacts 48 of the relay 10.

As the vehicle makes the left hand turn, the canceling pin 42 will travel in a counterclockwise direction to the position shown in FIGURE 2 engaging the trigger 34 on the side opposite the contact 40 and pivoting the trigger 34 out of the path of travel of the pin 42. During return of the vehicle to a straight ahead path after completion of the turn, the canceling pin 42 will engage the contact 40 on the canceling trigger 34 thus grounding the relay 12 and opening the contacts 54, 56, 58 and 60. If the driver should change his mind about making a left hand turn or if after making a left hand turn, the canceling pin 42 is not rotated a sufficient amount to cause engagement with the contact 40 after completion of the turn, the canceling of the turn signal lamp 64 may be affected by a second momentary engagement of the contact 30 by the contact member 22. Moreover, if the driver indicates a left turn and changes his mind desiring instead to indicate a right turn, it is merely necessary to move the lever 20 in a clockwise direction to momentarily engage the contact 28 thereby sending a pulse of current through the relay 10 which closes the contacts 46, 48, 50 and 52. As indicated previously, closure of the contact 48 applies ground to the relay 12 through the conductor 70 and the contacts 60, thus momentarily energizing the relay 12 and extinguishing the left turn signal lamp 64.

Notwithstanding the fact that the circuit is so interconnected that alternate energization of the relays 10 and 12 provides deenergization of the previously energized relay, both relays 10 and 12 may be momentarily energized simultaneously through the emergency switch 72, thus applying intermittent current to both the right and left turn signal lamps 62 and 64 when it is desired to indicate an emergency condition.

While the invention has been described with regards to a preferred embodiment thereof, this should not be construed in a limiting sense. Modifications and variations will now occur to those skilled in the art. For a definition of the invention, reference is made to the appended claims.

I claim:
1. A turn signal system comprising right and left turn signal lamps, right and left impulse relays connected to respectively energize the right and left turn signal lamps, manually operable means for selectively and momentarily energizing said impulse relays, circuit means interconnecting said relays whereby successive energization of said right impulse relay alternately connects and disconnects said right turn signal lamp to a source of intermittent current and alternate energization of said right and left impulse relays disconnects said right turn signal lamp from said source and connects said left turn signal lamp to said source.

2. A turn signal system comprising right and left turn signal lamps, a source of power, a flasher connected to one terminal of said source, right and left impulse relays operating respectively a plurality of normally open circuit closure means, a first of said circuit closure means connecting the right and left turn signal lamps to said flasher, a second of said circuit closure means connected to ground, a third of said circuit closure means connected to one side of the associated relay, the other side of said relay being connected to said one terminal of said source, circuit means connecting the second closure means of each of said relays with the third closure means of the other relay, manually operable turn signal actuating means normally spring biased to a neutral position but movable to an operating position for momentarily grounding either of said relays, additional switching means adapted to momentarily and simultaneously ground both of said relays to provide simultaneous flashing of said left and right turn signal lamps.

3. A turn signal system comprising right and left turn signal lamps, a source of power, a flasher connected between said source and said lamps, right and left impulse relays, manually operable turn signal actuating means movable from a neutral position to an operating position for momentarily energizing either of said relays, each of said relays operating respectively a plurality of normally open circuit closure means which alternately close and open in response to successive pulses of current through their respective relay, one of the normally open circuit closure means of the right and left impulse relays connecting said flasher to said right and left turn signal lamps, respectively, means connecting said right and left relays across said source through a second pair of the normally open circuit closure means of said left and right relays, respectively, successive energization of either of said relays alternately connecting and disconnecting the associated signal lamp to said flasher, alternate energization of said right and left relays alternately energizing said right and left turn signal lamps, additional switching means responsive to steering wheel rotation for momentarily energizing said relays after completion of a turn, emergency switching means for momentarily and simultaneously connecting both of said relays across said source to provide simultaneous flashing of said turn signal lamps.

4. A turn signal system comprising right and left turn signal lamps, a source of power, a flasher connected between said source and said lamps, right and left impulse relays, manually operable turn signal actuating means movable from a neutral position to an operating position for momentarily energizing either of said relays, each of said relays operating a plurtlity of pairs of normally open contacts which alternately close and open in response to successive pulses of current through the relay, one of the pairs of normally open contacts of said right and left impulse relays connecting said flasher to said right and left turn signal lamps, respectively, means connecting said right and left relays across said source through a second pair of the normally open contacts of said left and right relays, respectively, whereby either of said lamps may be deenergized by movement of said actuating means to either of said operating positions.

5. A turn signal system comprising right and left turn signal lamps, right and left impulse relays each controlling at least first, second, third and fourth normally open switches, a DC voltage source having a grounded terminal and a second terminal, a flasher connected between said second terminal and said first switches, means connecting one side of each of said relays to said second terminal, manually operable means for selectively and momentarily connecting the other side of said relays to ground, additional switching means responsive to steering wheel rotation connecting said other side of each of said relays to ground through said third switches of each of said relays, said second switches of said right and left relays connecting said other side of said left and right relays, respectively to ground through said fourth switches of said left and right relays, respectively, emergency switching means adapted to simultaneously and momentarily connect said opposite sides of both of said relays to ground.

References Cited

UNITED STATES PATENTS 2,521,304  9/1950  North _____ 340—54
2,659,838  11/1953  Durocher _____ 340—55 X NEIL C. READ, *Primary Examiner.*

A. H. WARING, *Assistant Examiner.*